United States Patent [19]

Sakai et al.

[11] 4,382,497

[45] May 10, 1983

[54] DEVICE FOR COOLING A FRICTIONAL CLUTCH FOR AN AUTOMOBILE

[75] Inventors: Ichio Sakai; Hisao Otani, both of Toyota, Japan

[73] Assignee: Toyota Jidosha Kogyo Kabushiki Kaisha, Toyota, Japan

[21] Appl. No.: 240,942

[22] Filed: Mar. 5, 1981

[30] Foreign Application Priority Data

Mar. 13, 1980 [JP] Japan .............................. 55-34195[U]

[51] Int. Cl.³ ............................................ F16D 13/72
[52] U.S. Cl. .............................. 192/113 A; 192/70.12
[58] Field of Search ................ 192/113 A, 70.12, 112; 188/71.6, 264 A

[56] References Cited

U.S. PATENT DOCUMENTS

| | | | |
|---|---|---|---|
| 2,089,786 | 8/1937 | Eason | 192/113 A X |
| 2,181,988 | 12/1939 | Davis | 188/71.6 |
| 2,198,792 | 4/1940 | Schjolin | 192/113 A X |
| 2,205,629 | 6/1940 | Peterson | 192/113 A |
| 2,310,203 | 2/1943 | Banker | 192/113 A |

*Primary Examiner*—Rodney H. Bonck
*Attorney, Agent, or Firm*—Oblon, Fisher, Spivak, McClelland & Maier

[57] ABSTRACT

A device for cooling a frictional clutch for an automobile with respect to a clutch housing provided between a cylinder block and a transmission case is herein disclosed. The device comprises passages respectively formed in surfaces of the clutch housing contacting the end plate and the transmission case for introducing and discharging cooling air into and from the clutch housing. Each of the passages has an opening toward the interior of the clutch housing and another opening toward the exterior of the clutch housing. The openings are deviated from each other with respect to the circumferential direction of the clutch housing.

4 Claims, 5 Drawing Figures

DEVICE FOR COOLING A FRICTIONAL CLUTCH FOR AN AUTOMOBILE

BACKGROUND OF THE INVENTION

1. Field of the Invention

The present invention relates to a device for cooling a frictional clutch for an automobile, and more particularly, it relates to a device for keeping the atmosphere within a clutch housing of the frictional clutch at a low temperature.

2. Description of the Prior Art

In a conventional frictional clutch for an automobile, it is required to keep the atmosphere within a clutch housing at a low temperature for improving frictional characteristics and durability thereof. In general, therefore, the outside air is introduced into the clutch housing to cool the interior thereof and then discharged outwardly of the clutch housing. In this case, however, holes and passages formed in the clutch housing for introduction and discharging of the cooling air should be designed to prevent water and mud from entering the clutch housing, and such conditions tend to make the clutch housing intricate in construction and expensive in manufacturing cost.

SUMMARY OF THE INVENTION

It is an object of the present invention to provide a device for cooling a frictional clutch for an automobile which can prevent water and mud from entering a clutch housing to improve cooling effect in the clutch housing.

It is another object of the present invention to provide a device for cooling a frictional clutch for an automobile which is simple in construction and low in manufacturing cost.

It is still another object of the present invention to provide a device for cooling a frictional clutch for an automobile which can keep the atmosphere within a clutch housing at a low temperature for maintaining the clutch durable and satisfactory in frictional characteristics.

DESCRIPTION OF THE PREFERRED EMBODIMENT

Figure 1:
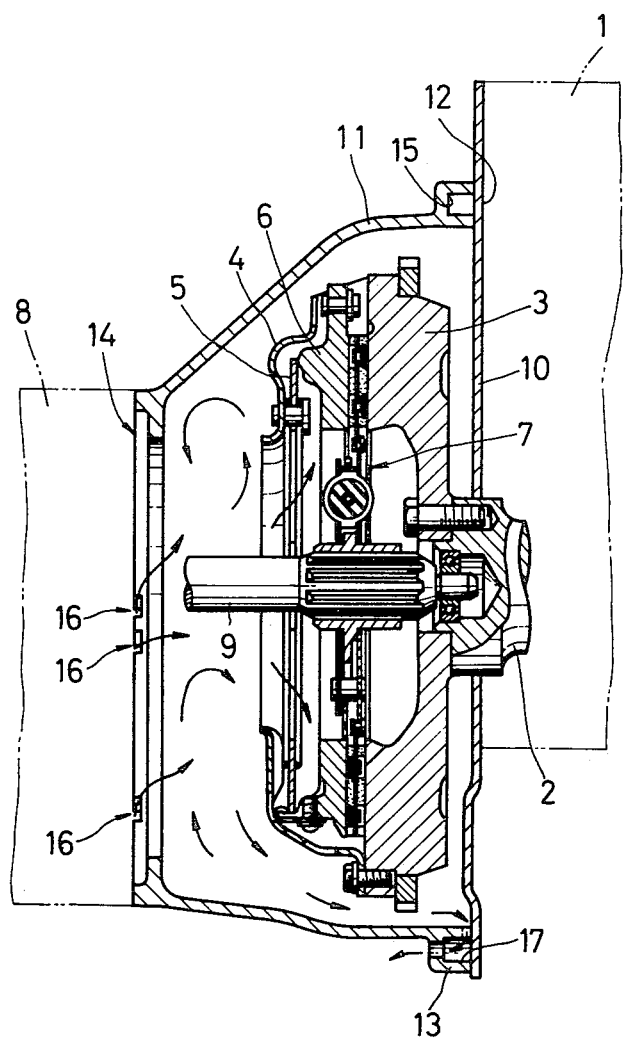
FIG. 1 is a longitudinal cross sectional view showing a principal part of a frictional clutch for an automobile.

Referring now to FIG. 1 of the drawings in which the principal part of a frictional clutch for an automobile is shown in section, numeral 1 indicates a cylinder block of an engine and numeral 2 indicates a crank shaft. The crank shaft 2 is integrally provided at one end with a flywheel 3, to which a clutch cover 4 is secured. Within the clutch cover 4, there are arranged a diaphragm spring 5 and a pressure plate 6 together with other necessary parts in a well-known manner. A clutch disc 7 arranged between the flywheel 3 and the pressure plate 6 is placed on a transmission input shaft 9 extending from a transmission case 8.

Figure 2:
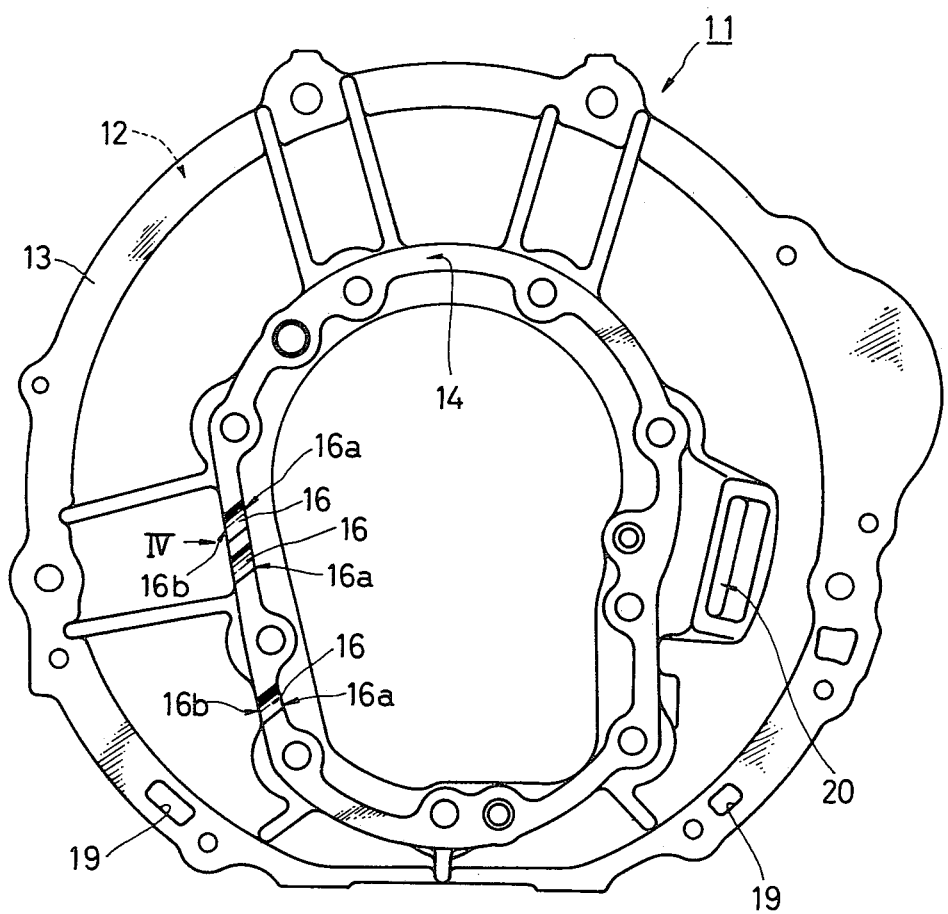
FIGS. 2 and 3 are enlarged rear and front plan views of the clutch housing.
Figure 3:
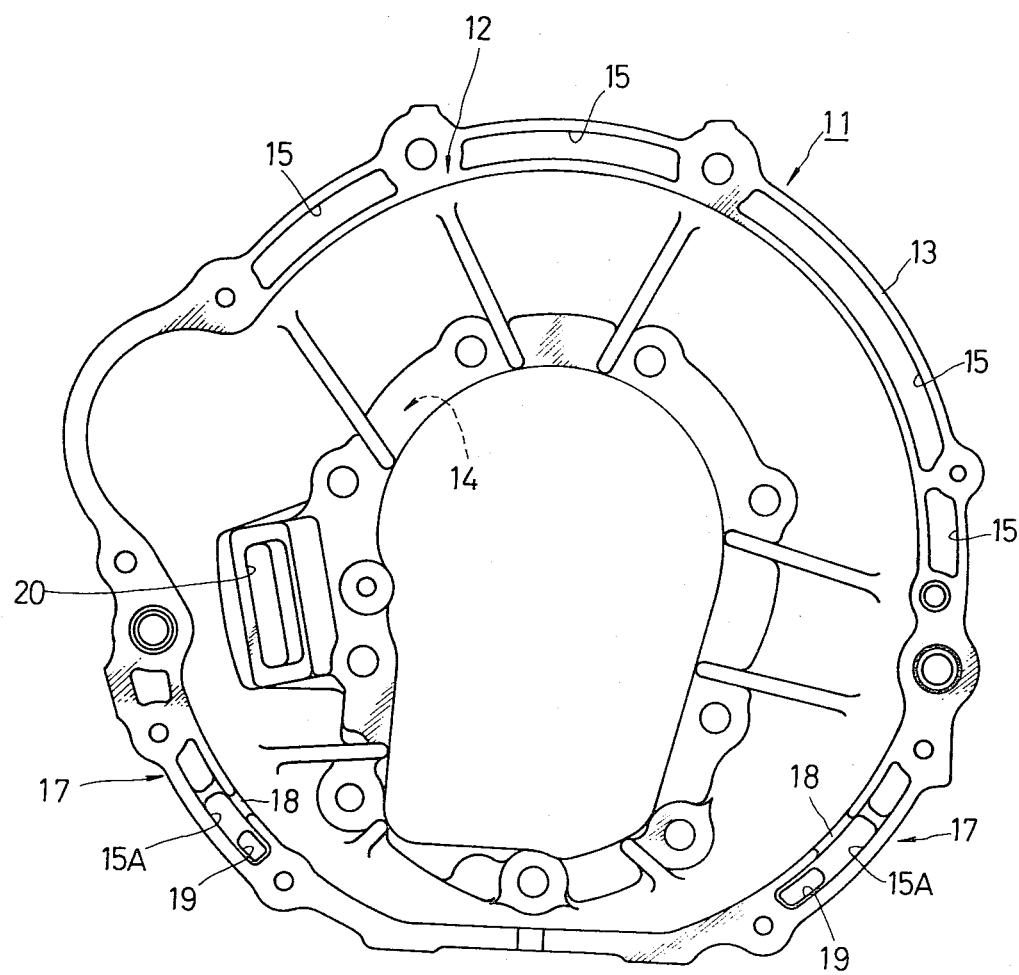

A clutch housing 11 containing the aforementioned parts of the frictional clutch is arranged between an end plate 10 of the cylinder block 1 and the transmission case 8. FIGS. 2 and 3 show enlarged views of the clutch housing 11 as seen from the rear side, i.e., the left-hand side of FIG. 1 and the front side, i.e., the right-hand side of FIG. 1 respectively.

Figure 4:
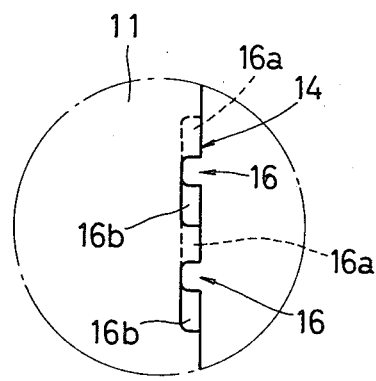
FIG. 4 is an enlarged side elevational view of a part of FIG. 2 as seen from the direction indicated by an arrow IV.

As shown in FIG. 2, the clutch housing 11 partially has in a surface 14 contacting the transmission case 8 a plurality of grooves 16 which are adapted to define air passages for introducing cooling air from the outside of the clutch housing 11 into the interior thereof. The grooves 16 are, as shown in FIG. 4, formed by recesses slightly cut in the contact surface 14. When the contact surface 14 is fitted with the transmission case 8 for assemblying of the clutch housing 11, the grooves 16 define the aforementioned air passages. Each groove 16 is slantedly formed in which an opening 16b toward the exterior of the clutch housing 11 is provided downwardly of an opening 16a toward the interior. The groove 16 is thus slantedly and shallowly formed so as to prevent water and mud from entering the housing 11 through the same.

Figure 5:
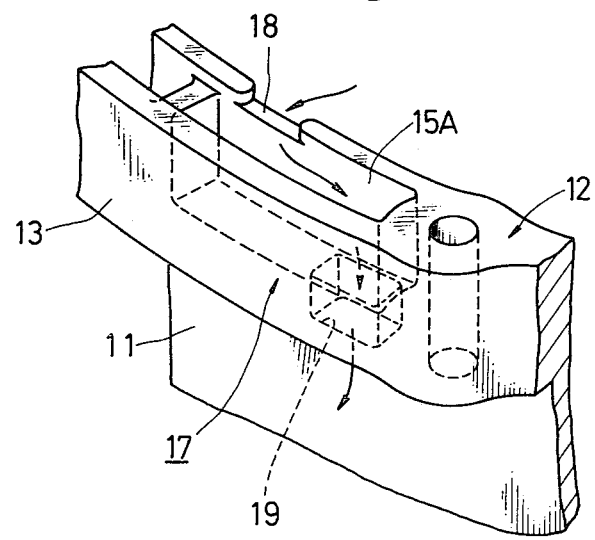
FIG. 5 is an enlarged perspective view of a part of FIG. 3.

In FIG. 3 showing the front side of the clutch housing 11, a surface 12 contacting the end plate 10 comprises a flange 13 and a plurality of circumferentially provided grooves 15 for reinforcing the flange 13. A pair of grooves 15A provided in the lower portion in FIG. 3 define exhaust passages 17 for discharging air from the interior of the clutch housing 11 to the exterior thereof. Each exhaust passage 17 is provided with, as is obvious from FIG. 5 showing an enlarged perspective view, a recess 18 and a through-hole 19 for making the groove 15A communicate with the interior and the exterior of the clutch housing 11 respectively. The recess 18 communicating with the interior of the clutch housing 11 and the through-hole 19 communicating with the exterior of the clutch housing 11 are deviated from each other with respect to the circumferential direction of the contact surface 12 (see FIG. 5), thereby preventing water and mud from entering the interior of the clutch housing 11.

In FIGS. 2 and 3, numeral 20 indicates an opening formed in the clutch housing 11 for receiving a clutch release fork (not shown).

When the flywheel 3, the clutch cover 4 and other parts are rotated with the crank shaft 2, circulation of air takes place in the clutch housing 11. Air is introduced into the interior of the clutch housing 11 through the grooves 16, circulated within the housing 11 as indicated by arrows in FIG. 1 and is discharged outwardly of the clutch housing 11 through the exhaust passages 17. By virtue of this, the parts of the frictional clutch contained in the clutch housing 11 are effectively cooled especially in the frictional surfaces between the flywheel 3, the clutch disc 7 and the pressure plate 6.

Further, the grooves 16 defining the air passages function to introduce cooling air in the vicinity of the axis of rotation of the parts constructing the frictional clutch within the clutch housing 11 while the exhaust passages 17 function to outwardly discharge the air in the vicinity of the outer periphery of the clutch housing 11. Consequently, the difference in air pressure between the air passages and the exhaust passages 17 becomes large and the amount of circulation of the air within the clutch housing 11 is increased to improve cooling efficiency. The air passages and the exhaust passages can be easily made by slightly modifying designs of the contact surfaces 12 and 14 of the clutch housing 11, which will not substantially increase the cost for manufacturing the clutch housing 11.

While the invention has been described with reference to a preferred embodiment thereof, it is to be understood that modifications or variations may be easily made without departing from the scope of this invention which is defined by the appended claims.

What is claimed is:

1. In combination with a clutch housing of a frictional clutch for an automobile provided between an end plate of a cylinder block and a transmission case, a device for cooling said frictional clutch comprising passages respectively formed in surfaces of said clutch housing contacting said end plate and said transmission case for introducing and discharging cooling air into and from said clutch housing, each of said passages having an opening toward the interior of said clutch housing and another opening toward the exterior of said clutch housing, said openings being deviated from each other with respect to the circumferential direction of said clutch housing.

2. The invention as defined in claim 1 wherein each of said passages for introducing said cooling air into said clutch housing is in the form of a slanted groove in which said opening toward the exterior is provided downwardly of said opening toward the interior.

3. The invention as defined in claim 1 wherein said surface of said clutch housing contacting said end plate is formed by a flange and a plurality of grooves circumferentially provided on said flange, at least two of said grooves defining said passages for discharging said cooling air from said clutch housing.

4. The invention as defined in claim 3 wherein each of said passages for discharging said cooling air from said clutch housing has a recess communicating with the interior of said clutch housing and a through-hole communicating with the exterior of said clutch housing, said recess and said through-hole being deviated from each other.

* * * * *